Figure 2:
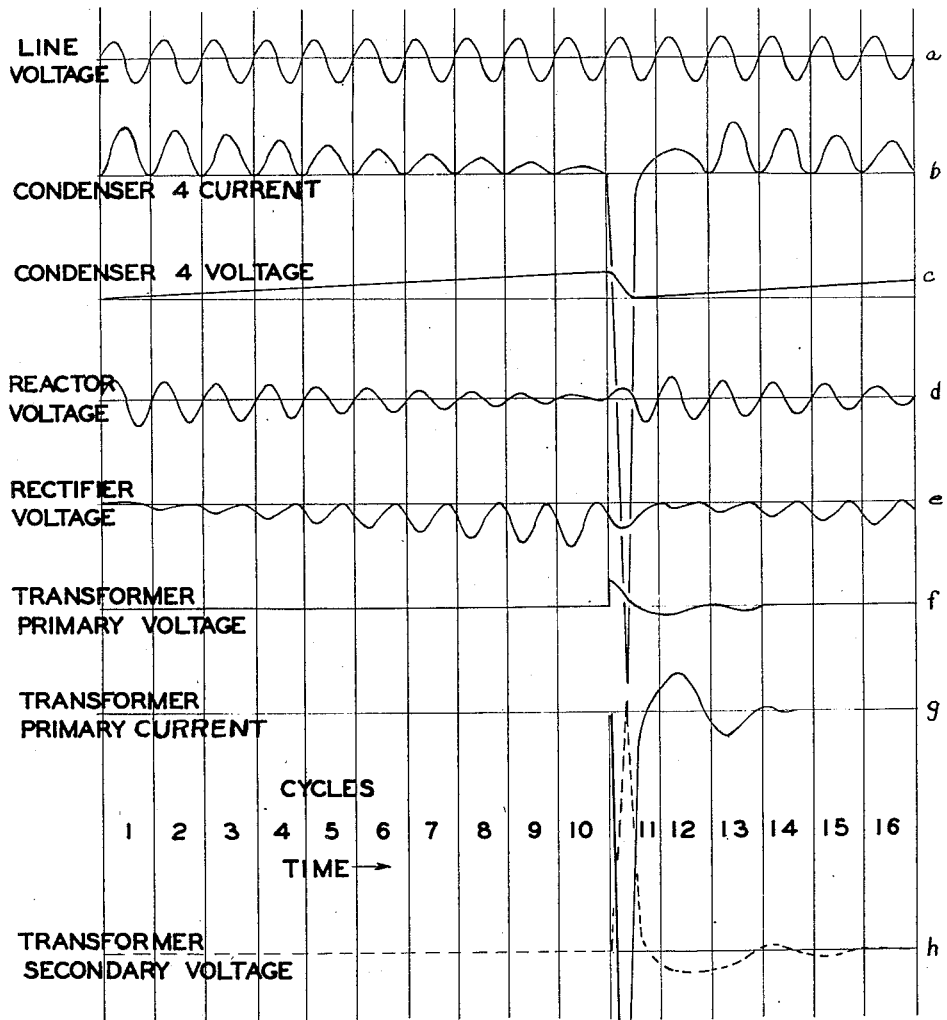

Jan. 31, 1939.                C. B. HORSLEY                2,145,724
                             CONTACT WELDING

Filed March 24, 1937

INVENTOR
CAPERTON B. HORSLEY
BY
ATTORNEYS

Patented Jan. 31, 1939

2,145,724

UNITED STATES PATENT OFFICE 2,145,724

CONTACT WELDING

Caperton B. Horsley, Gates Mills, Ohio

Application March 24, 1937, Serial No. 132,714

13 Claims. (Cl. 171—97)

This invention relates to means for controlling electric currents, particularly high intensity currents of short duration such as those used for making resistance welds.

It is well known in the welding art that many advantages may be obtained by increasing the current intensity and correspondingly shortening the duration of the current when making resistance welds, particularly when welding dissimilar metals or metal sections of different or slight thicknesses.

In order to obtain currents of sufficient intensity, it is ordinarily necessary to have very heavy duty power lines to supply current to the welding transformer in order to secure satisfactory regulation. It is also necessary to interrupt this current frequently. Furthermore, even with heavy duty power lines, the high current necessary in this type of installation may cause fluctuations in the voltage supplied by the line transformers or by the high voltage line itself.

Furthermore, the duration of the welding current is so short that an appreciable variation in the time, and therefore in the heat applied to the weld, is caused by the variable length of time that is taken to quench the arc when the circuit is opened. Variation in the heat applied to the weld also occurs if the current is not always turned on at substantially the same relative position on the voltage wave, and many mechanical and electrical difficulties arise in attempting to accomplish this circuit closing in fixed time relationship to the voltage wave.

The wear of the contacts due to the excessive arcing that occurs at such high currents constitutes a serious problem, necessitating frequent resurfacing or replacement of the contacts, and consequent frequent interruption of production.

Objects of this invention are to provide means for obtaining currents of high intensity and short duration, and accurately timing the same, so that the latter are independent of the usual line voltage variation, variation due to arcing at the contacts, and variation due to changes in the phase relation at the time of contact closing. Another object toward eliminating arcing at the contacts, is to eliminate changes in the phase relation between current and voltage at the time of contact closure. And a further object is to reduce the required size of conductors and line transformers required for the circuit, and permit the use of a comparatively constant low amperage current as distinguished from an intermittent high amperage current.

A typical application of my invention being to resistance welding, as applied to such welding further objects of the invention are to provide uniform welding heat irrespective of the usual variation in line voltage, the resistance of the weld and wear at the contacts. Other objects are to provide means for heating the weld to maximum temperature as quickly as possible, and controlling the rate of cooling of the weld, in order to prevent deleterious changes in the metal structure at and adjacent the weld—all with a minimum amount of energy.

Figure 1:
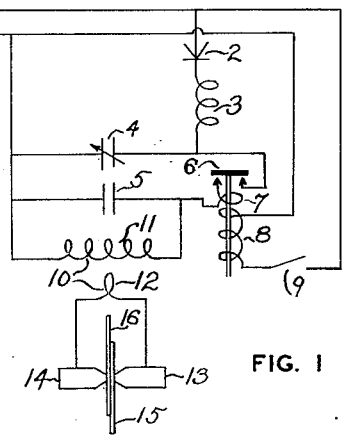

The exact nature of this invention together with further objects and advantages thereof will be apparent from the following description taken in connection with the accompanying drawing, in which Fig. 1 conventionally represents an elementary circuit illustrative of the invention as applied to welding, and Fig. 2 illustrates the performance characteristics of this circuit.

With reference to Fig. 1, this elementary circuit comprises a source of alternating current, conventionally indicated as the line $L_1$, $L_2$, a rectifier 2, which may be of copper oxide type, a reactor 3, a condenser 4 which may be of electrolytic type and is tapped or otherwise arranged to be adjusted to various capacity values, an auxiliary condenser 5, a normally open magnetic contactor 6 with a series hold-in coil 7 and a conventional actuating coil 8, a switch 9 for timing of the welding current, a welding transformer 10 with primary and secondary windings 11 and 12, welding electrodes 13 and 14, and two plates to be welded together indicated at 15 and 16.

Operation of this circuit is as follows, with alternating line voltage supplied at $L_1$, $L_2$, as indicated by curve $a$ in Fig. 2, and with the work pieces 15 and 16 held in contact by pressure from electrodes 13 and 14: Switch 9 and magnetic contactor 6 being open, condenser 4 is charged to the peak voltage of the alternating current source $L_1$, $L_2$, as is indicated by that portion of curve $c$ in Fig. 2 approaching cycle section 11. No appreciable current flows through rectifier 2 or reactor 3. The voltage across rectifier 2 is indicated by the corresponding portion of the curve $e$, no appreciable voltage being impressed on reactor 3, as is indicated by the curve $d$.

When switch 9 is closed, magnetic contactor coil 8 is energized and closes magnetic contactor 6, impressing the voltage of condenser 4 on transformer primary 11, and, incidentally, charging auxiliary condenser 5.

Condenser 5 is ordinarily of much smaller capacity than condenser 4 and is provided to reduce sparking at the contacts of magnetic contactor 6 when these contacts are opened. This condenser is not necessary for the operation of this circuit but will act to further reduce sparking at these contacts, which sparking is primarily reduced by the operating characteristic of the circuit whether or not condenser 5 is used.

The voltage impressed on the transformer primary 11 is shown at curve f in Fig. 2, and the current through this primary winding is shown at g. Curve h indicates the secondary winding voltage, and generally the welding current also, since the weld generally approximates a linear resistance load.

As soon as magnetic contactor 6 is closed, switch 9 may be opened without opening this contactor, since the contactor is so proportioned and designed that it will be automatically held closed by the current flowing through series coil 7 until this current has decayed or decreased to such a low value that the contactor may be opened without destructive sparking at the contacts. Reactor 3 is so proportioned that the current it will supply to primary 11 after condenser 4 has been effectively discharged will not be of sufficient value to cause deleterious sparking at these contacts.

It will be apparent to those familiar with the art that with a circuit of the type herein disclosed, welding transformer 10, and other component parts, may be readily designed and proportioned to provide the most effective wave form h of the welding voltage or current from the point of view of heat versus time during the period of the weld for any particular welding condition. For example, if the effective inductance of transformer 10 is increased, the length of time necessary for the welding current to reach its peak value will be increased. By giving consideration to the magnetic saturation of the core of transformer 10 and its effect on the transformer inductance, further modifications of wave form h may be obtained. Moreover, it is contemplated that the components of this circuit may be so proportioned that the effective frequency of the welding current may be made of any value desired, irrespective of the line current frequency or the total time of the welding period. This may permit the use of a very high frequency in making the weld so that the weld will have characteristics not usually associated with a fusion weld, the metals uniting and firmly adhering to each other without any apparent intermingling.

Furthermore, the total amount of heat applied to the weld may be predetermined by the adjustment of the capacity of condenser 4, or, if desired, by adjusting the voltage supplied to the circuit. This heat will be uniform for each weld after such adjustment has been made and will not be subject to variations due to variations in any timing device or arcing at the contacts or variation in the resistance of the weld or short variations in the line voltage.

After magnetic contactor 6 has opened, condenser 4 will automatically be recharged, the time necessary for recharging condenser 4 at any set capacity being a function of the line voltage, the impedance of reactor 3, and the resistance of rectifier 2.

Switch 9 may be closed at any time after condenser 4 is recharged and the heat of the previous weld will be exactly duplicated.

It is obvious that this circuit is not limited in its application to welding but may be applied for producing consistent short time X-ray exposures, or for any applications where it is important to duplicate the time of current flow or the total wattage supplied and/or to provide a wave form having a desirable distribution of current, voltage, or wattage with time.

What I claim is:

1. A circuit comprising a condenser, a potential source for charging said condenser, a load through which said condenser may be discharged, means for discharging said condenser through said load, means for automatically maintaining said discharging means in discharging relation to said load until the discharge current has decayed to a predetermined value, and means predetermining the rate of said current decay and including an auxiliary condenser.

2. A circuit comprising a condenser, a potential source for charging said condenser, a load through which said condenser may be discharged, means for discharging said condenser through said load, and means for predetermining the effective frequency of the load current and including an auxiliary condenser arranged across said load.

3. A circuit comprising a condenser, a potential source for charging said condenser, a load through which said condenser may be discharged, means for discharging said condenser through said load, and means for predetermining the wave form of the load current and including an auxiliary condenser arranged across said load.

4. In combination with a load, and a condenser having associated charging means, means providing for discharging connection of said condenser to said load and including switch means having an actuator arranged to terminate said connection automatically responsive to load current.

5. In combination with a load, and a condenser having associated charging means, means providing for discharging connection of said condenser to said load and including switch means having an actuator arranged to terminate said connection automatically before complete discharge of said condenser.

6. In combination with a load, and a condenser having associated charging means, means providing for discharging connection of said condenser to said load and including switch means having an actuator arranged to terminate said connection automatically after substantial discharge of said condenser but before said condenser is completely discharged.

7. In combination with a load, a condenser, and means providing for discharging connection of said condenser to said load, means for charging said condenser from an alternating current line and including a rectifier adapted to pass current only in charging direction, whereby the charge of said condenser, and consequently its discharge, will be unimpaired should the line voltage drop immediately preceding said discharge.

8. In combination with a load, a condenser, means providing charging connection of said condenser to a line and including a rectifier adapted to pass current only in charging direction, means providing for discharging connection of said condenser to said load without disturbing said charging connection, and including switch means arranged to terminate said discharging connection automatically responsive to predetermined depreciation in load current.

9. In combination with a load, and a condenser having associated charging means, means providing for discharging connection of said condenser to said load and including means for establishing said connection at the will of the operator, and means for terminating said connection automatically responsive to predetermined decay of discharge current.

10. In combination with a load, a condenser, means providing charging connection of said condenser to a line and including a rectifier adapted to pass current only in charging direction, means providing for discharging connection of said condenser to said load without disturbing said charging connection, and including means for establishing said discharging connection at the will of the operator, and means for terminating said connection automatically responsive to predetermined decay of discharge current.

11. In combination with a line, a condenser, and a load, means for charging said condenser from said line and including a rectifier and a reactor arranged in series with said condenser, and means for discharging said condenser to said load and including switch means having a holding coil arranged in series with said load and an auxiliary condenser arranged across said load.

12. In an electric circuit for the purpose described and arranged to serve a load from a line, means for limiting flow of line current to said load automatically independent of line voltage and including condenser, rectifier and reactor means in series relation to each other, and switch means in series relation to said condenser means and said load, said switch means being arranged to open automatically responsive to predetermined load current decay.

13. In a circuit comprising a condenser, a potential source for charging said condenser, a load served by said condenser, switch means for controlling connection of said condenser to said load and arranged to terminate said connection automatically responsive to predetermined load current decay, and reactor means for controlling flow of line current to said load when said condenser is connected thereto.

CAPERTON B. HORSLEY.